July 13, 1926.
C. H. COLVIN
1,592,081
DIRECTIONAL STABILIZER
Filed May 12, 1919      2 Sheets-Sheet 1
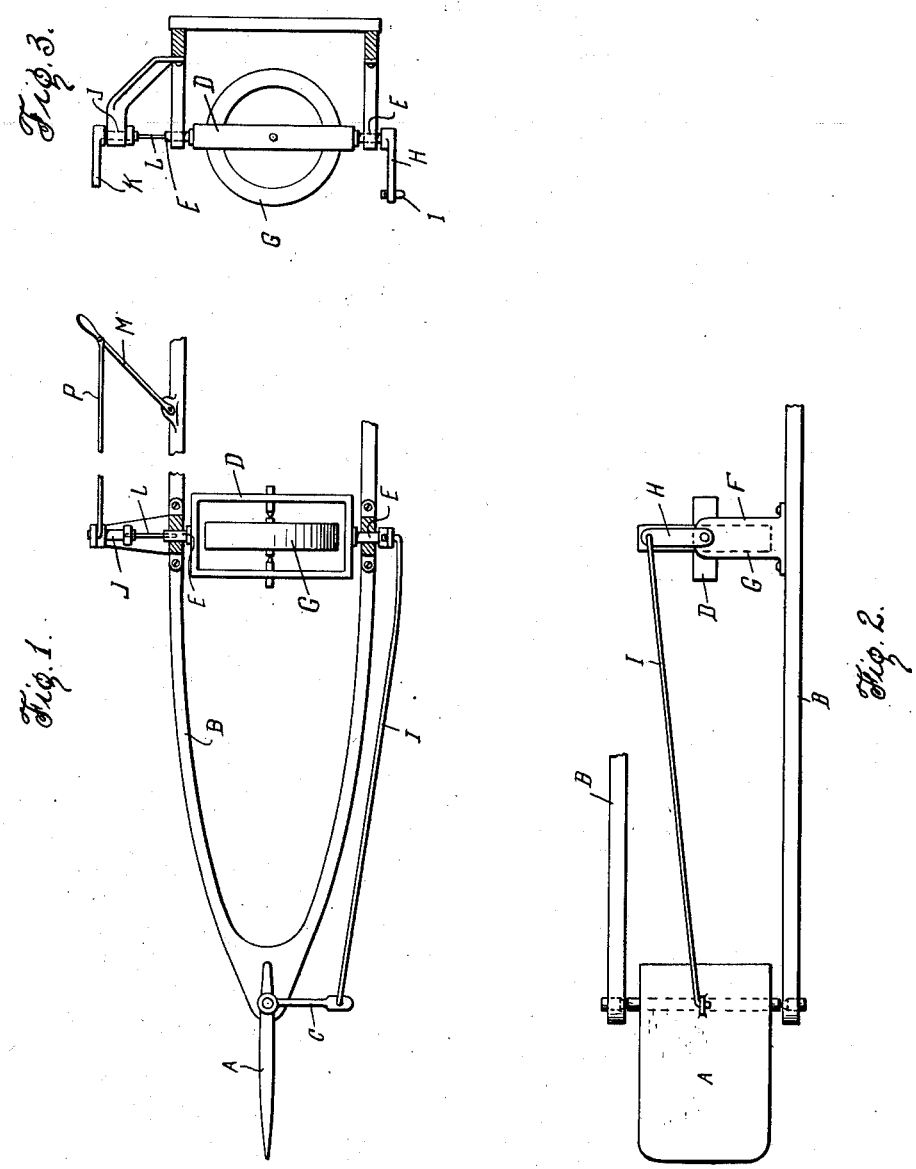
Inventor
Charles H. Colvin
By      Attorney July 13, 1926.
C. H. COLVIN
DIRECTIONAL STABILIZER
Filed May 12, 1919 2 Sheets-Sheet 2
1,592,081
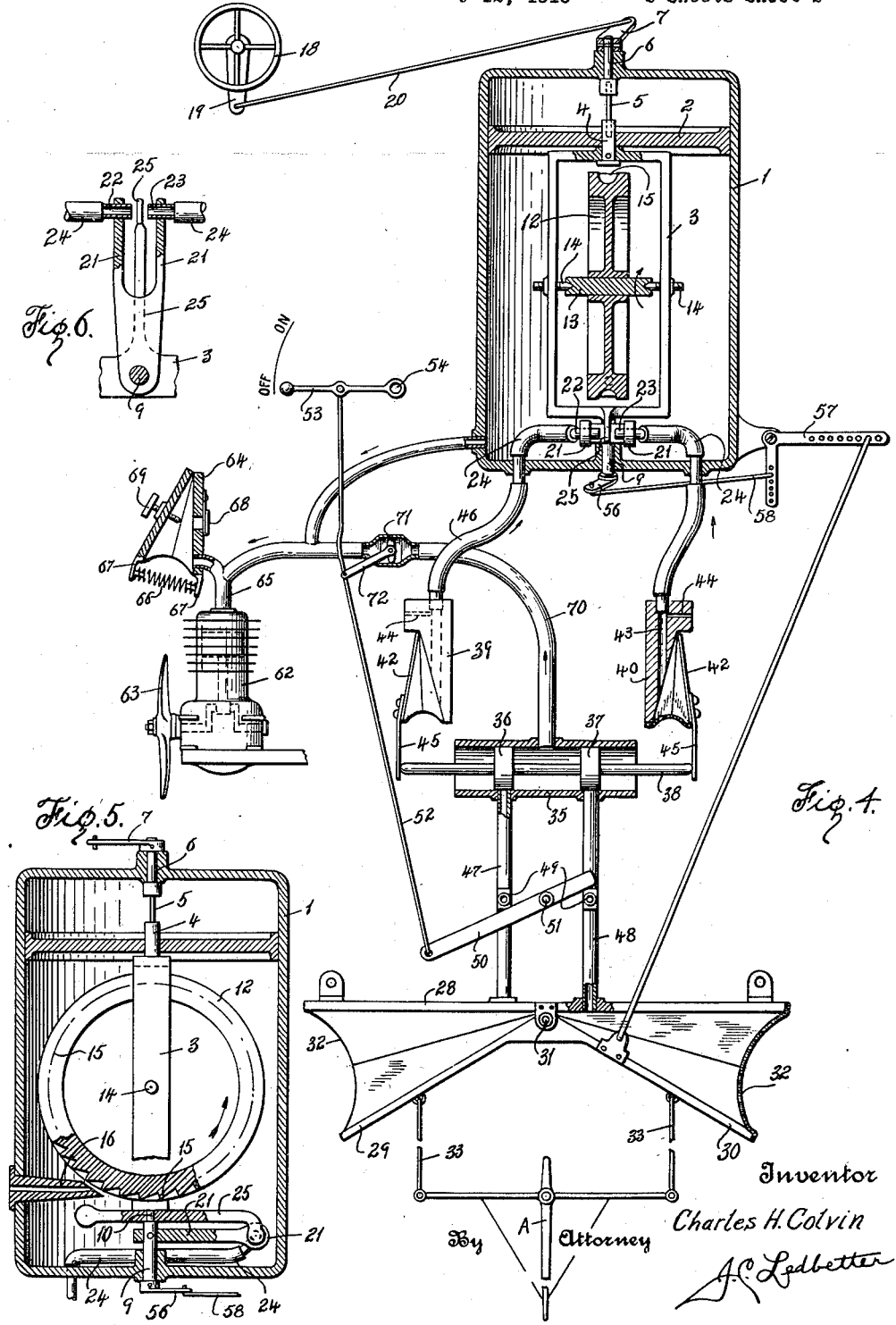

Patented July 13, 1926.

1,592,081

UNITED STATES PATENT OFFICE.

CHARLES H. COLVIN, OF BROOKLYN, NEW YORK.

DIRECTIONAL STABILIZER.

Application filed May 12, 1919. Serial No. 296,293.

This invention relates to power steering apparatus for dirigible craft or vehicles of all kinds. More particularly the invention relates to an automatic steering pilot for airplanes and airships, and which is known in the aeronautical art as a directional stabilizer.

A broad purpose of the invention is to provide means for automatically steering aircraft of all kinds so as to relieve the pilot of constantly attending the steering of the craft; and a feature of the invention resides in the employment of a suitable gyroscopic device in combination with any suitable motive power, such as a vacuum motor, for accomplishing the purpose named.

It is also a purpose to produce a pilot for aircraft which employs a gyroscope connected either directly or indirectly with the rudder of the craft, and means provided to adjust the spinning plane of the gyroscope so as to slightly alter the setting of the rudder.

More particularly, a purpose of this invention is to combine a turn detector with a motor to exercise directional stabilization of an airplane and thus automatically maintain straight line flight of the craft independent of the aviator.

A feature of this invention is a turn detector incorporating a gyroscope having two degrees of freedom, and so arranged as to anticipate or instantly detect angular movement of the craft about the vertical, that is, to detect any turn tendency of the craft off its original straight line course of flight, and to so utilize this faculty of the detector as to make the whole system automatic in action.

This directional stabilizer is specifically designed for the purpose of automatically confining an airplane to a straight line flight, yet another purpose of this invention is to provide means for maneuvering the plane in the air by manually operated elements accessible to the aviator. A craft, ship, or other vehicle may, therefore be either subject to the control of the pilot in turns and other maneuvers, or in automatic straight line flight, according to the desire and convenience of the pilot.

Another object of the invention is to employ means for automatically holding the airplane or craft on a predetermined curved course, and stabilizing said plane in curved flight in a manner similar to stabilizing it in a straight line flight.

Figures 1, 2 and 3 of the drawings illustrate a fundamental form of the gyroscopic control employed in connection with the rudder of the air craft, showing the stabilizer in its simplest form. The remaining views of the drawings illustrate different designs and applications of the invention to the air craft. The first three figures of the drawings illustrate an apparatus to be installed in an airplane and directly connected with the rudder thereof. The remaining figures of the drawings illustrate a control apparatus embodying a gyroscopic turn detector used for governing a power means which in turn actuates the rudder.

Figure 1 illustrates a plan view of a portion of an airplane fuselage or tail structure upon which the gyroscopic machine is installed for direct connection with the rudder; Figure 2 shows a side view thereof; and Figure 3 shows a partial end view of Figure 1.

Figure 4 illustrates a plan assembly view of the complete apparatus, many parts being shown in sectional view.

Figure 5 shows a sectional view of the turn detector incorporated in my invention.

Figure 6 is a detail view of a certain vacuum control valve which is operated by the turn detector for controlling the power means.

The drawings and plans forming a part hereof are diagrammatic in form so that a comprehensive understanding of the invention can be gained. The presently described apparatus is, therefore, in its simplest or elementary form, and it will be understood that a standard form of mechanical pilot designed and built for aircraft under these specifications and claims, will vary somewhat in design and mechanical construction, but will embody the principles inherent within this disclosure.

A complete description of the diagrammatic and mechanical construction will first be given, after which the operation will be explained.

Referring now to the first three figures of the drawings, the reference character A points out a rudder pivotally mounted upon a rudder post and carried between the fuselage or longeron beams B. This is the usual practice of present day airplane construction to employ a pivoted rudder surface provided with actuating levers, one of which is shown at C.

A gyroscopic frame D is provided with shafts E fixed thereto. The gyroscopic frame is rotatably mounted in suitable brackets or bearings F which carry the shafts of the frame. A gyroscopic rotor G is journaled in the frame and rotated or spun at high speed. An arm H is fixed to one of the rotatable shafts E. A link I connects the arm H with the rudder arm or actuating arm C. Thus it is seen that the gyroscopic turn detector, comprising the rotor and frame, is capable of an oscillating motion about its axis E, and during such operation the gyroscopic element will move the rudder A from side to side in a steering relation.

A shaft J is journaled in a bracket, and an arm K is fixed upon one end of this shaft. A flexible spring torsion link L has each end thereof fixed into each end of the shafts J and E, and thus connects the gyroscopic element with the lever K. A hand lever M, or other suitable device, is mounted in an accessible position adjacent the aviator's seat.

"A gyro having two degrees of freedom" is used in connection with this invention, meaning that the rotor of the gyro element is journaled upon its bearings to rotate, which is the first degree of freedom, and the gyroscopic frame D is also mounted in journals as shown and adapted to oscillate about the axis thereof, which is known as the second degree of freedom; and taking together these two degrees of freedom, or directions of freedom, describes what is technically known to those versed in the art as "a gyro having two degrees of freedom."

This invention essentially has to do with a gyro instrument having two degrees of freedom. The spinning axis of the gyro G, and the oscillating axis E of the frame D are mounted in the air craft so that when the craft is in horizontal flight both axes are normally horizontal. A gyroscopic instrument when thus mounted in an airplane will not oscillate about the axis E as long as the plane continues on a straight line flight, which is one of the phenomena and a function of a gyroscope. Therefore, during straight line flight of the plane the gyro element remains steadily in its original set position, namely, a vertical spinning plane for the rotor G. As there is no movement of the gyro under these conditions the rudder remains in a neutral position. But when the plane varies from straight line flight the gyro immediately rotates about the axis of the frame D, which is known to those versed in the art as "precession of the gyroscope."

The gyro precesses against the torsional resistance of the flexible spring torsion link L which tends to return the gyro to normal centralized position. The link I is so connected with the rudder and gyro that it actuates the rudder in a direction to bring the plane back on straight line flight when the gyro undergoes precession due to the varying of said plane off of its original course. If the airplane tends to turn slightly to the right the gyro so precesses as to cause the rear portion of the rudder A to move to the left, and this action tends to bring the plane back to its original straight line flight or heading. The whole action is reversed should the plane turn to the left.

Thus the gyroscopic instrument illustrated in the first three figures of the drawings is directly connected to the rudder of the plane and functions to confine the airplane to an approximately straight and true course.

The control lever M can be manipulated by the aviator to alter the setting of the gyro to establish the rudder in a position to hold the airplane on the desired flight path. Should the aviator find that his plane is flying on a curve he will adjust the member M to move the spinning plane of the rotor into a new position, which works the rudder A over to correct the turning movement of the craft. Conversely the lever M can be used to alter the position of the gyro and rudder, so as to cause the plane to automatically follow any desired curved path.

Referring particularly to Figures 4 to 11 inclusive, the numeral 1 points out a substantially air-tight turn detector case. This case is preferably cylindrical in form and sufficiently air-tight to enable evacuating means to keep the air within this case well drawn off or well rarefied. A disc or spider frame 2 is inserted within the case 1. A small rectangular shaped frame 3 has a pintle shaft 4 which is journaled in the spider 2. The shaft projects through the spider and is fixedly attached to a flexible spring link 5. A shaft 6 is journaled in the end wall of the turn detector with a lever arm 7 fixed thereto. The flexible spring link is fixedly attached to the shaft 6, such that movement of the arm 7 will apply torque to the frame 3. The other end of the frame is also provided with a pivotal support axially aligned with the shaft 4, which comprises a shaft 9 journaled in the wall of the case 1. This shaft is reduced in diameter on one end at 10 and journals within the frame 3 such that the frame is permitted to undergo an oscillating motion about the axis of the two pivot shafts which support the frame. The shaft 13 of the rotor 12 is rotatably supported on a pair of pintle shafts 14 which are screw threaded or otherwise secured in the frame 3. The outer rim of the rotor has notches 15 formed therein.

An air pressure nozzle 16 is fixed in the case, with a small bore communicating to outside atmosphere, thus adapting the nozzle to direct a jet of high velocity air against the notches in the rim of the rotor for spinning it at high velocity.

A hand adjusting wheel 18, with a lever 19 fixed thereto, is operatively connected with the arm 7 thru a link 20 pivotally confined within holes formed in the two arms. This device is used by the pilot to transmit a slight torque to the gyro 12 thru the flexible link 5.

An upstanding bracket, comprising spaced parallel arms 21, is fixed to the shaft 9, and as the shaft 9 is moved, likewise the bracket is moved. These arms 21 have fitted in their outer ends, vacuum nozzles 22 and 23. The nozzles are preferably mounted in the spaced members so they may have their open adjacent ends adjusted relative to each other by increasing or decreasing the space between said nozzle ends. Tubes 24 are tightly fitted onto the vacuum nozzles and lead out of the turn detector case thru appropriate airtight means as shown. These tubes are necessarily flexible and of such length as not to oppose the oscillating motion of the arms 21. A nozzle closure vane 25 is fixed to the frame 3 of the gyroscope with the upper end of the vane normally poised and centrally spaced between the vacuum nozzles. The flexible spring link 5 holds the vane in centralized position between the vacuum nozzles. If the vane does not properly centralize, that is line up in central position between the nozzles, the hand wheel 18 is moved slightly in proper direction to act thru the flexible spring link for setting the vane over in closer relation to one of the nozzles until absolute centralization is attained.

The above description covers the normal and usual setting of the relative positions of the nozzles and closure vane. In using this directional pilot stabilizer on a dirigible vehicle, it often will be desirable to set the gyroscopic element of the turn detector off the normally centralized position. As later seen this action is carried out for the purpose of directing the plane or craft on a curved course of either small or great radius. This comprises one of the essential features of the invention, and as the description is further developed it will be seen how this means acts in a controlling way on the plane in flight.

An air motor or motors are employed for actuating the rudder or steering plane of the aircraft. I preferably employ power means consisting of bellows or pneumatics operated on air pressure gained by exhaustion of the air from said motor by a vacuum pump or other means. This motor in the diagrammatic form comprises a base plate or frame 28 which may be securely installed in the aircraft and preferably located somewhere adjacent the rudder thereof. A pair of bellows plates 29 and 30 are joined together and pivotally established upon the base plate by employing a pivot center or bearing 31. The structure of the bellows or pneumatic motor is completed by applying the flexible covering 32 upon the frame and to the plates such that airtight enclosed bellows chambers are formed inside of the flexible covering. This motor has direct control of a rudder A of the aircraft to be controlled or automatically steered. Connecting links 33 are attached to the bellows plates and pivotally join with the cross arm of the rudder. Thus it is seen how the rudder may be swung about its pivot point by the closing action of the bellows plates as first one then the other opens and closes.

A vacuum regulating means is incorporated in the apparatus for governing the operation of a power motor. This comprises a primary valve, consisting of a tube 35 fitted with a double acting piston set 36 and 37 fixed upon the piston rod 38, the ends of said rod projecting from the open ends of the tube 35. Pneumatic actuators 39 and 40 are associated with the primary valve. The actuators are simple forms of the well known pneumatics comprising a base upon which a bellows plate 42 is hingedly secured for movement relative to said base. An air channel 43 is formed in the base for exhausting the air from the bellows chamber. A bore 44 is drilled into the base and connects the channel with the outer atmosphere, so that the pneumatic may be filled with air at atmospheric pressure whenever the vacuum supply is cut off from the air channel bore 43, even though the air supply is comparatively limited and restricted in its flow thru the bore 44. The bellows plates have extended ports 45 which lie in close relation to the ends of the piston rod of the primary valve. Tubes 46 establish air vacuum line connections between the actuators and the vacuum nozzles.

Tubes 47 and 48 respectively connect the motor bellows 29 and 30 with the primary valve 35. The pipes are fixed into ports in the valve tube, the ports being normally closed by the pistons. The drawings show the normal position of the several parts with the actuators engaging the primary valve to confine it in a normally inactive closed position against air or vacuum flow to or from the power motor bellows 28 which actuate the rudder A. Valve ports 49 are included in the air lines 47 and 48, and a port closure member 50 is pivoted at 51 in such a manner that it may be moved over the open ports, tightly sealing them. A link 52 is pivotally attached to the closure member 50 and connects to a hand lever 53 which is pivoted at 54. The lever will have an "Off" and "On" marking indication to enable the pilot to set the handle to either close or open the valves 49.

A lever arm 56 is fixed to the shaft 9, and a bell crank 57 is provided with one arm thereof pivotally joined with a link 58 which in turn connects with the lever arm 56. The other arm of the bell crank is pivotally connected with a link 59 which is connected with one of the pneumatics plates of the power motor. When the vacuum motor moves the link 59, the shaft 9 will be rotated, and the nozzles 22 and 23 will be moved relatively to the closure vane 25 which stands normally stationary between the nozzles. The bell crank is provided with a plurality of adjustment holes in each arm in order that the ratio of the levers in the linkage assembly just described can be varied. Thus if it is desired to oscillate the nozzles very slightly the link 58 will be connected with one of the holes closer to the pivot center of the bell crank and the link 59 will be moved further out from the center.

A vacuum exhausting pump is employed with other accessory apparatus for operating the system. This pump is driven from the slip stream of the airplane propeller, or from the airplane engine direct, or by any other suitable means. It will be understood that the power for operating this system will be derived from vacuum, and any appropriate source of vacuum can be used. In this instance a simple form of vacuum pump 62 is shown having a propeller 63, which is exposed to the air or the slip stream of the airplane propeller which drives the pump for creating a vacuum supply. A vacuum reservoir bellows 64 is connected with the pump thru a tube 65, and is fitted with a compression spring 66 confined between two fingers 67. The compression spring keeps the bellows normally open, but as the vacuum builds up thru the system, the bellows yields and tends to steady the vacuum supply. A flap valve 68 is fitted to the bellows, and an adjusting screw 69 is employed in the opposite element of the bellows and adapted to impinge the flap whenever the bellows is nearly collapsed or exhausted. This presses open the flap valve 68 and admits air into the system, thus lowering the vacuum in case the suction from the pump becomes too great. By proper adjustment of the screw 69 the vacuum can be maintained at any degree desirable for the best operation of the system.

The vacuum pump is connected with the primary valve 35 thru a tube 70. Thus a ready vacuum supply is maintained in the valve ready to be selectively connected with either one of the air motors 29 or 30. A cut off valve 71 is included in the vacuum line 70, and is fitted with a valve arm 72 which is pivotally connected with the link 52. In the position illustrated the valve 71 is closed and the valves 49 are opened. When the hand lever 53 is moved forward to the "on" position, the valve 71 will be opened and the valves 49 will be closed. These valves are for the purpose of putting the system in or out of operation.

It is now in order to explain the operation of the form of steering apparatus shown in Figure 4. It is assumed that the vacuum pump 62 has run for a sufficient time to bring the gyro wheel 12 up to speed, and that the lever 53 has been shifted to the "on" position thus opening valve 71 and closing ports 49. The apparatus is now ready to function upon the slightest turning of the airplane off of the course. If now the plane turns to the right the gyro precesses to the left by slightly twisting the torsion link 5, that is the gyro rotates the frame 3 in its bearings so that the closure vane 25 will move towards the left and tend to cover the nozzle 22. The vacuum supply is thus cut off from pneumatic 39 and as the nozzle 23 is fully opened the pneumatic 40 collapses thus shifting the pistons 36 and 37 to the left and connecting the vacuum supply to the left bellows 29 which collapses and moves the rudder to the left for opposing the tendency of the plane to turn to the right. It is seen that when the pistons 36 and 37 are moved to one side it not only connects the vacuum supply to one bellows but also connects the other bellows to the atmosphere thus allowing one bellows to take in air and expand while the other is evacuated and collapses. It is also seen that when the pistons are in the central position, the air lines to both bellows are closed, thus confining the air in them and locking the rudder against any disturbing forces that might tend to throw it off. The holes 44 are for the purpose of admitting air to each valve operating pneumatic when it is cut off from the vacuum supply so as to allow it to taken in air and expand freely as it is pushed open by the force of the collapsing pneumatic working thru the rod 38.

In turning to the left the action is the same as described except that the gyro turn detector precesses to the right, the closure vane closes the right nozzle 23 and thus collapses the left pneumatic 39 and admits vacuum to the right bellows and moves the rudder to the right, to counteract the left turning tendency.

The link connection 57—58 and 59 connecting the air motor and the turn detector is for the purpose of making the position of the rudder dependent upon the angle of precession of the gyroscope. This link connection is called by those skilled in the art a "follow up" connection. It will be readily seen from the foregoing description that were it not for the follow up the rudder would be moved its full amount when the plane deviated only a slight amount from its course. Therefore the force exerted by the rudder would be far greater than required and would often cause the plane to follow an erratic path. The action of the "follow up" is as follows:—When the plane turns, the gyro element precesses and because of the restraining action of the flexible spring link 5, the angle of precession will vary with the angular velocity of the airplane. The precession of the gyro moves the closure vane 25 closer to one nozzle and further from the other, thus operating the pneumatic motor as previously explained. The movement of the pneumatic motor is transmitted to the nozzles so as to equalize the gaps between them and the closure vane, and to centralize the piston assembly and thus stop the movement of the pneumatic motor. Therefore, for a given angle of precession there is a corresponding position of the rudder which can, however, be adjusted to suit any particular plane or condition by varying the ratio of the link connections as previously described.

The hand wheel 18 is used for turning the plane, or for causing it to follow any desired course. By rotating the wheel the flexible spring link 5 is made to apply torque about the precessional axis of the gyro element causing it to rotate about this axis and to move the rudder which causes the plane to turn. The turning of the plane tends to make the gyro precess against the tension of the spring 5 and the plane will turn at such a rate that the precessional force will equal the force of the spring.

The lever 53 is used for the purpose of putting the system in or out of operation. In the "off" position the vacuum supply is cut off from the control valves and the ports 49 are open. The air motors will therefore offer little obstruction to the movement of the rudder by the usual manual means, for the ports 49 allow the air to pass freely in and out of the air bellows. In the "on" position the valve 71 is open to admit vacuum to the control valves and the ports 49 are closed tight to prevent leakage.

This apparatus may be designed to operate upon compressed air as well as vacuum. In case it is desired to use compressed air it will only be necessary to make certain changes in details of the design to accommodate the new power means.

This directional control system, or stabilizer system, can be employed to great advantages on large air craft which are flown over long courses. The apparatus will relieve the aviator of constant attention to the rudder, and simplify navigation of craft over long ocean flight and land flights.

Having thus described the invention, what I claim is as follows:—

1. A directional stabilizer, comprising in combination; a gyro frame pivoted relatively to the aircraft, a gyro rotor journaled therein, a closure vane carried by the frame, a pair of spaced air nozzles with the closure vane disposed therebetween, a pneumatic motor, a tubular air line connected with each air nozzle and connecting with the pneumatic motor, and air means for running the rotor and the pneumatic motor.

2. A directional stabilizer, comprising in combination, an air bellows having two bellows plates, a primary control valve, pipe connections employed between the valve and the air bellows, a valve in each pipe connection, a vacuum pump, connection between the vacuum pump and the primary control valve, a cut off valve in the connection between the pump and control valve, a means common to the cut off valve and the valve in each pipe connection for actuating said valves, pneumatic valves correlated with the primary valve, a turn detector for controlling the pneumatic valves, a manually operated means for adjusting the turn detector, and a follow up means interposed between the turn detector and the air bellows.

3. A directional pilot for aircraft comprising, a gyroscope, a connection established between the gyroscope and the rudder of the aircraft whereby the rudder is moved by the force of gyroscopic precession, a manually operated means for altering the position of the gyroscope, and a follow-up device to prevent over control of the craft.

4. A directional pilot for aircraft comprising, a gyroscope, a connection established between the gyroscope and the rudder of the craft whereby the rudder is moved by the force of gyroscopic precession, a spring connected to the gyroscope, and a manual control device connected with the spring to transmit torque to the gyroscope to adjust its plane of rotation.

5. A directional stabilizer for dirigible craft comprising in combination, a gyroscope, a connection established between the gyroscope and the rudder of said craft whereby the precession of the gyroscope is caused to move said rudder, a resilient member attached to said gyroscope, a manual control member attached to said resilient member, so that the plane of rotation of the gyroscope and the corresponding position of the rudder may be altered at will.

6. A turn detector for aircraft comprising, a casing, a frame journaled in said casing, a gyroscope journaled in said frame, a spring fixed to the frame, and a hand control device external to the casing and connected to said spring so that the position of the gyroscope may be altered.

7. A pilot for aircraft, comprising in combination, a turn detector consisting of a gyroscope, a spring connected with the gyroscope, and means for exerting torque thru the spring to vary the spinning plane of the gyroscope, a motor connected to the rudder of the aircraft, and a connection established between the motor and turn detector whereby the detector governs the action of the motor.

8. A pilot for aircraft, comprising in combination, a turn detector consisting of a gyroscopic element, air suction means to drive the gyroscope, and a vacuum motor operated by the aforesaid air suction means and capable of actuating the rudder of the aircraft.

9. A pilot for aircraft, comprising in combination, a turn detector having a gyroscope driven by a suction system, an air-bellows servo motor to operate the aircraft rudder, a suction pump to run the gyroscope and the servo motor, and an equalizing bellows connected with the suction system to regulate the amount of suction employed to operate the system.

10. A pilot for aircraft, comprising a gyroscopic turn detector, an air nozzle arranged to deliver air under pressure to spin the gyroscope, a suction system connected with the turn detector, a pair of spaced suction nozzles, and a movable device interposed between the nozzles for opening and closing one nozzle at a time, and a bellows servo motor connected with the nozzles of the turn detector.

11. An automatic pilot for dirigible vehicles having a rudder or other steering apparatus, comprising a gyroscope embodying a frame and a rotor, the said gyroscope frame being pivotally installed upon the vehicle and capable of undergoing a precessional motion, a steering arm fixed to the gyroscope frame, a connection made between the steering arm and the rudder, a torsional link attached to the gyroscope frame, and means under the control of a pilot for manually rotating the torsional link for altering the position of the gyroscope.

In testimony whereof I affix my signature.

CHARLES H. COLVIN.